(12) United States Patent
Walker et al.

(10) Patent No.: US 10,802,485 B2
(45) Date of Patent: Oct. 13, 2020

(54) APPARATUS, METHOD AND COMPUTER PROGRAM PRODUCT FOR FACILITATING NAVIGATION OF A VEHICLE BASED UPON A QUALITY INDEX OF THE MAP DATA

(71) Applicant: HERE Global B.V., Eindhoven (NL)

(72) Inventors: Belle Walker, Berkeley, CA (US); Uyen Nguyen, Lombard, IL (US); Daniel Weinstein, Crockett, CA (US); Pamela Korda, Chicago, IL (US); Xin Chen, Evanston, IL (US); David Doria, Oak Park, IL (US); Phillip Bernard, Martinez, CA (US); Ralf Herrtwich, Berlin (DE)

(73) Assignee: HERE Global B.V., Eindhoven (NL)

( * ) Notice: Subject to any disclaimer, the term of this patent is extended or adjusted under 35 U.S.C. 154(b) by 125 days.

(21) Appl. No.: 15/728,153

(22) Filed: Oct. 9, 2017

(65) Prior Publication Data
US 2019/0107836 A1  Apr. 11, 2019

(51) Int. Cl.
| | | |
|---|---|---|
| G01C 21/00 | (2006.01) | |
| G05D 1/00 | (2006.01) | |
| G01C 21/32 | (2006.01) | |
| G05D 1/02 | (2020.01) | |
| G06K 9/00 | (2006.01) | |
| G06F 16/29 | (2019.01) | |

(52) U.S. Cl.
CPC .......... *G05D 1/0088* (2013.01); *G01C 21/32* (2013.01); *G05D 1/0246* (2013.01); *G06F 16/29* (2019.01); *G06K 9/00791* (2013.01); *G05D 2201/0213* (2013.01)

(58) Field of Classification Search
CPC .............. G05D 1/0088; G05D 1/0246; G05D 2201/0213; G06F 16/29; G01C 21/32; G06K 9/00791
USPC .......................................................... 701/25
See application file for complete search history.

(56) References Cited

U.S. PATENT DOCUMENTS

| | | |
|---|---|---|
| 8,577,596 B2 | 11/2013 | Stahlin et al. |
| 8,825,394 B2 | 9/2014 | Johansson et al. |
| 9,612,123 B1 | 4/2017 | Levinson et al. |

(Continued)

FOREIGN PATENT DOCUMENTS

| | | |
|---|---|---|
| JP | 2003-098958 A | 4/2003 |

OTHER PUBLICATIONS

International Search Report and Written Opinion for Application No. PCT/IB2018/057786 dated Jan. 29, 2019, 14 pages.

*Primary Examiner* — Gertrude Arthur Jeanglaude
(74) *Attorney, Agent, or Firm* — Alston & Bird LLP

(57) ABSTRACT

An apparatus, method and computer program product are provided to facilitate the navigation of a vehicle, such as an autonomous vehicle, utilizing map data in which the quality associated with the map data is provided in a more computationally efficient manner. In the context of a method a plurality of different types of sensor data are received including map data, camera data and detector data. The method determines a quality index associated with the map data and weights the reliance upon the map data relative to other types of sensor data based upon the quality index associated with the map data. The method further includes determining navigation information for the vehicle based at least partly upon the weighting of the map data relative to other types of sensor data.

24 Claims, 4 Drawing Sheets

(56) References Cited

U.S. PATENT DOCUMENTS

| | | | |
|---|---|---|---|
| 2010/0241354 A1* | 9/2010 | Stahlin | B60W 40/02 |
| | | | 701/532 |
| 2011/0060524 A1 | 3/2011 | Miyajima et al. | |
| 2016/0259814 A1 | 9/2016 | Mizoguchi | |
| 2016/0318368 A1* | 11/2016 | Alger | B60H 1/00771 |
| 2017/0109612 A1 | 4/2017 | Mittal et al. | |
| 2017/0248439 A1 | 8/2017 | Sakai et al. | |

* cited by examiner

APPARATUS, METHOD AND COMPUTER PROGRAM PRODUCT FOR FACILITATING NAVIGATION OF A VEHICLE BASED UPON A QUALITY INDEX OF THE MAP DATA

TECHNICAL FIELD

An apparatus, method and computer program product are provided for facilitating navigation of a vehicle and, more particularly, for facilitating navigation of a vehicle, such as an autonomous vehicle, at least partly based upon the quality index associated with map data.

BACKGROUND

The navigation of a vehicle is oftentimes dependent upon map data that defines a number of objects on or about the roadways. These objects include road segments, road signs, lane markers, bridges and many other features. In order to provide some assurance as to the relative quality of the map data, a high level statement is sometimes associated with the map data to provide a general indication of the quality of the map data. This general indication of the quality of the map data may be sufficient for vehicular travel that relies upon manual driving of the vehicle since the driver also has responsibility for the navigation of the vehicle and evaluation of the map data.

However, autonomous vehicles do not rely upon the manual driving of the vehicle and, instead, base the navigation of the autonomous vehicle upon a variety of sensor data. As such, the sensor data must typically be of higher quality. This sensor data is provided by a number of different types of sensors including, for example, cameras carried by the vehicle and configured to capture images of the environment about the vehicle and other detector devices, such as a radar system, a light detection and ranging (LIDAR) system or the like. Further, the sensor data relied upon by the autonomous vehicle includes map data. Based upon an analysis of a combination of the sensor data, the autonomous vehicle is guided along its route. In order to rely upon the different types of sensor data, the quality associated with each of the different types of sensor data must be defined and must generally satisfy a predefined quality standard. While cameras and other detector devices are readily configured to provide information regarding the quality of the data provided, the generalized, high level statements as to the quality of map data are generally insufficient to ensure that the navigation systems of autonomous vehicles can rely upon the map data.

In order to provide a more detailed indication as to the quality associated with the map data, the map data could be compared with reference data that is known to be of a predefined accuracy. On any large scale, however, the comparison of map data to reference data having a predefined accuracy is computationally intensive and time consuming and, in many instances, is impractical, if not impossible. As such, the comparison of map data to reference data having a predefined accuracy cannot reasonably be performed in order to assess the quality of the map data in most, if not all, instances involving an autonomous vehicle as a result of the quantity of map data consumed by the autonomous vehicle during navigation being relatively extensive.

BRIEF SUMMARY

An apparatus, method and computer program product are provided in accordance with an example embodiment in order to facilitate the navigation of a vehicle, such as an autonomous vehicle, utilizing map data in which the quality associated with the map data is provided in a more computationally efficient manner By providing an indication as to the quality associated with the map data, the navigation of a vehicle, such as an autonomous vehicle, may take into account the quality associated with the map data in relation to determining the manner in which the map data is to be combined with other types of sensor data, thereby allowing for the navigation of the autonomous vehicle in a reliable and trustworthy manner. The quality information associated with the map data in accordance with an example embodiment is granular or localized, thereby further facilitating the determination as to the manner in which the map data can be relied upon relative to other types of sensor data in conjunction with the navigation of a vehicle in a localized manner Thus, the manner in which the different types of sensor data are combined in order to facilitate navigation of a vehicle may vary from location to location depending upon changes in the quality associated with the map data at the different locations, thereby further increasing the reliability and trustworthiness of the navigation supported by the map data.

In an example embodiment, a method for facilitating the navigation of a vehicle is provided that includes receiving a plurality of different types of sensor data including map data, camera data and detector data. For example, the method may receive camera data and detector data from a camera and a detector, respectively, onboard the vehicle. The method determines a quality index associated with the map data and weights the reliance upon the map data relative to other types of sensor data based upon the quality index associated with the map data. For example, the quality index may include a quality prediction for accuracy of an object, a quality prediction for existence confidence of the object and/or a quality prediction for classification contents of the object. The method further includes determining navigation information for the vehicle based at least partly upon the weighting of the map data relative to other types of sensor data.

In relation to weighting the reliance upon the map data, the method of an example embodiment places increased reliance upon the map data relative to other types of sensor data in an instance in which the quality index indicates that the map data is of a higher quality than in an instance in which the quality index indicates that the map data is of a lower quality. In an embodiment in which the vehicle comprises an autonomous vehicle, the determination of the navigation information may include defining a route to be followed by the autonomous vehicle based at least partly upon the weighting of the map data relative to other types of sensor data. The method of an example embodiment also includes modifying the quality index associated with one or more objects represented by the map data over time by causing the quality index associated with the one or more objects to decay over time until the map data associated with the one or more objects is refreshed. In this regard, the quality index associated with one or more objects may decay at different rates over time depending upon a type of object represented by the map data. In relation to determining the quality index, the method of an example embodiment separately determines the quality index for one or more discrete objects and one or more continuous objects represented by the map data.

In another embodiment, an apparatus is provided for facilitating navigation of a vehicle. The apparatus includes at least one processor and at least one memory including computer program code with the at least one memory and the computer program code configured to, with the processor, cause the apparatus to at least receive a plurality of different types of sensor data including map data, camera data and detector data. For example, the different types of sensor data may include camera data and detector data from a camera and a detector, respectively, onboard the vehicle. The at least one memory and the computer program code are also configured to, with the processor, cause the apparatus to determine a quality index associated with the map data and to weight reliance upon the map data relative to other types of sensor data based upon the quality index associated with the map data. For example, the quality index may be one or more of a quality prediction for accuracy of an object, a quality prediction for existence confidence of the object and/or a quality prediction for classification confidence of the object. The at least one memory and the computer program code are further configured to, with the processor, cause the apparatus to determine navigation information for the vehicle based at least partly upon the weighting of the map data relative to other types of sensor data.

The at least one memory and the computer program code are configured to, with the processor, cause the apparatus of an example embodiment to weight reliance upon the map data by placing increased reliance on the map data relative to other types of sensor data in an instance in which the quality index indicates that the map data is of a higher quality than in an instance in which the quality index indicates that the map data is of a lower quality. In an embodiment in which the vehicle comprises an autonomous vehicle, the at least one memory and the computer program code are configured to, with the processor, cause the apparatus of this example embodiment to determine navigation information by defining a route to be followed by the autonomous vehicle based at least partly upon the weighting of the map data relative to other types of sensor data. The at least one memory and the computer program code are further configured to, with the processor, cause the apparatus of an example embodiment to modify the quality index associated with one or more objects represented by the map data over time by causing the quality index associated with the one or more objects to decay over time until the map data associated with the one or more objects is refreshed. In this regard, the quality index associated with one or more objects may decay at different rates over time depending upon the type of object represented by the map data. The at least one memory and the computer program code are configured to, with the processor, cause the apparatus of an example embodiment to determine the quality index by separately determining the quality index for one or more discrete objects and one or more continuous objects represented by the map data.

In a further example embodiment, a computer program product is provided for facilitating navigation of a vehicle. The computer program product includes at least one non-transitory computer-readable storage medium having computer-executable program code portions stored therein. The computer-executable program code portions include program code instructions configured to receive a plurality of different types of sensor data including map data, camera data and detector data. For example, the camera data and the detector data may be received from a camera and a detector, respectively, onboard the vehicle. The computer-executable program code portions also include program code instructions configured to determine a quality index associated with the map data. In this regard, the quality index may include a one or more of a quality prediction for accuracy of an object, a quality prediction for existence confidence of the object and/or a quality prediction for classification confidence of the object. The computer-executable program code portions additionally include program code instructions configured to weight reliance upon the map data relative to other types of sensor data based upon the quality index associated with the map data and program code instructions configured to determine navigation information for the vehicle based at least partly upon the weighting of the map data relative to other types of sensor data.

The program code instructions configured to weight reliance upon the map data may, in one embodiment, include program code instructions configured to place increased reliance upon the map data relative to other types of sensor data in an instance in which the quality index indicates that the map data is of a higher quality than in an instance in which the quality index indicates the map data is of a lower quality. In an embodiment in which the vehicle comprises an autonomous vehicle, the program code instructions configured to determine navigation information may include program code instructions configured to define a route to be followed by the autonomous vehicle based at least partly upon of the weighting of the map data relative to other types of sensor data. In an example embodiment, the computer-executable program code portions further include program code instructions configured to modify the quality index associated with one or more objects represented by the map data over time by causing the quality index associated with the one or more objects to decay over time until the map data associated with the one or more objects is refreshed. For example, the quality index associated with one or more objects may decay at different rates over time depending upon a type of object represented by the map data. The program code instructions configured to determine the quality index in accordance with an example embodiment include program code instructions configured to separately determine the quality index for one or more discrete objects and one or more continuous objects represented by the map data.

In yet another example embodiment, an apparatus is provided for facilitating navigation of a vehicle that includes means for receiving a plurality of different types of sensor data including map data, camera data and detector data. The apparatus of this example embodiment also includes means for determining a quality index associated with the map data and means for weighting reliance upon the map data relative to other types of sensor data based upon the quality index associated with the map data. The apparatus of this example embodiment further includes means for determining navigation information for the vehicle based at least partly upon the weighting of the map data relative to other types of sensor data.

BRIEF DESCRIPTION OF THE DRAWINGS

Figure 1:
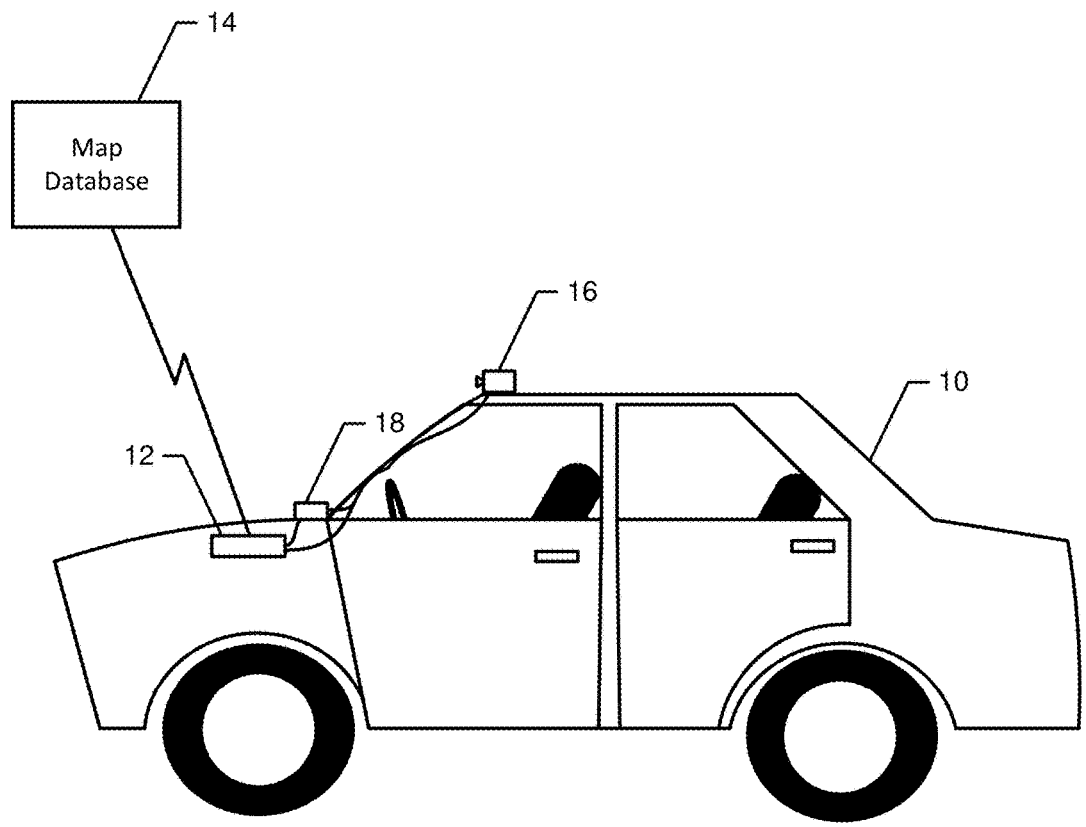
Figure 2:
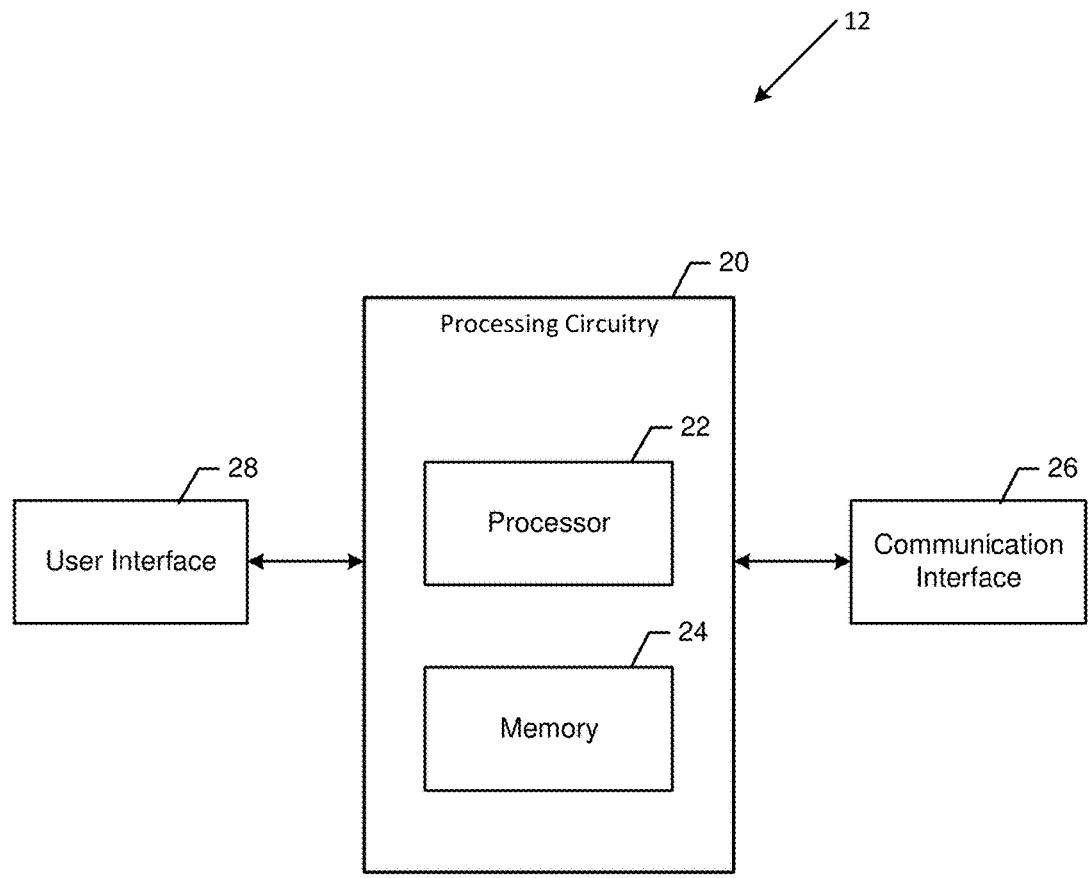
Figure 3:
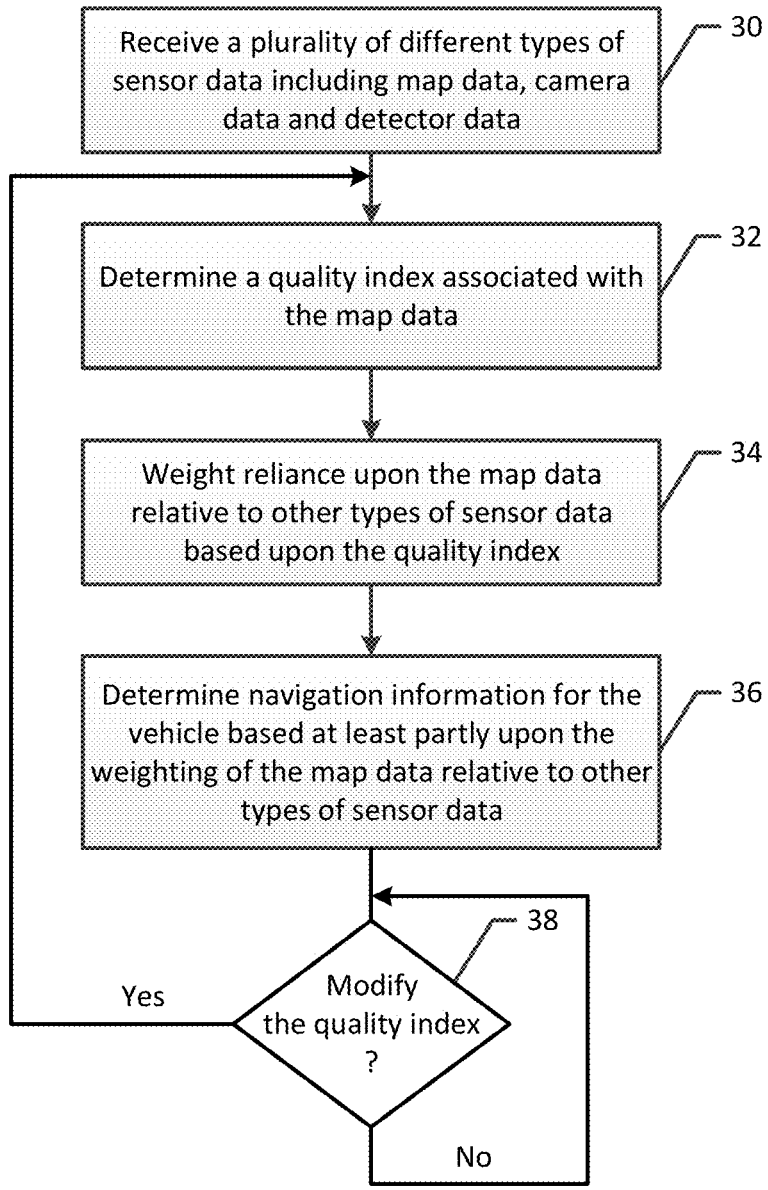
Figure 4:
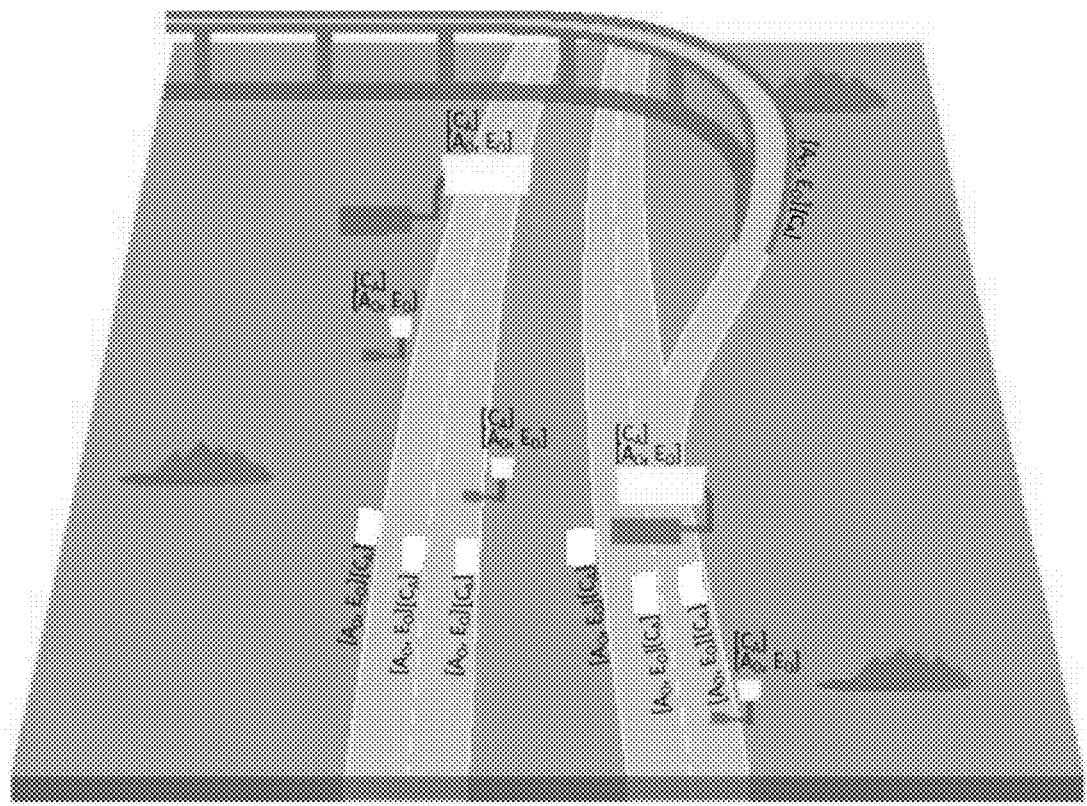

Having thus described certain example embodiments of the present disclosure in general terms, reference will hereinafter be made to the accompanying drawings, which are not necessarily drawn to scale, and wherein:

FIG. 1 is a schematic representation of an autonomous vehicle that is navigated basedf, at least in part, upon different types of sensor data including map data, camera data and detector data that are weighted relative to one another in accordance with an example embodiment o the present disclosure;

FIG. 2 is a block diagram of an apparatus specifically configured in accordance with an example embodiment of the present disclosure and configured to receive sensor data from a variety of different types of sensors;

FIG. 3 is a flowchart illustrating the operations performed, such as by the apparatus of FIG. 2, in accordance with an example embodiment of the present disclosure; and FIG. 4 is a schematic representation of a portion of a map having a plurality of objects for which a quality index is defined in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

An apparatus, method and computer program product are provided to facilitate navigation of a vehicle, such as an autonomous vehicle, be it either a fully autonomous vehicle or a partly autonomous vehicle. In this regard, the apparatus, method and computer program product of an example embodiment facilitate navigation of the vehicle based upon a variety of different types of sensor data including map data, camera data and detector data. Based at least in part upon the quality index associated with the map data, the apparatus, method and computer program product of an example embodiment differently weight reliance upon the different types of sensor data including the map data such that the resulting navigation of the autonomous vehicle has increased reliability and trustworthiness.

As the quality index associated with map data may be separately determined on a localized basis, the reliance upon the different types of sensor data including the map data may vary from location to location in accordance with an example embodiment in order to further increase the reliability and trustworthiness of the navigation facilitated by the apparatus, method and computer program product of an example embodiment. Additionally or alternatively, the quality index of at least some objects represented by the map data may decay over time until the quality data is refreshed in order to take into account the possibility that the position of certain objects may change over time. Thus, the reliance upon the different types of sensor data may correspondingly vary over time in accordance with potential changes in at least some objects represented by the map data.

Referring now to FIG. 1, an autonomous vehicle 10 is schematically represented. The apparatus 12 for facilitating navigation of the autonomous vehicle is configured to receive a variety of different types of sensor data. The apparatus may be carried by the vehicle or may be offboard the vehicle, but in communication therewith, such as by being in communication with a navigation and/or mapping system onboard the vehicle. As shown in FIG. 1, the apparatus is configured to receive camera data from a camera 16 onboard the autonomous vehicle and detector data from one or more detectors 18 onboard the autonomous vehicle. Different types of detectors may be carried by the autonomous vehicle and configured to provide detector data including, for example, a radar system, a LIDAR system and/or the like. Depending upon the type of camera and the type of detector device carried by the autonomous vehicle, the camera data and the detector data generally have predefined respective qualities associated therewith.

The apparatus 12 for facilitating navigation of the autonomous vehicle 10 is also configured to receive sensor data in the form of map data. The map data may be stored by a map database onboard the vehicle or may be provided by a map database 14 remote from the vehicle, but assessable to the apparatus, such as via a communication interface of the apparatus, for facilitating navigation of the autonomous vehicle. The map data identifies a number of objects as well as the location of the respective objects and, in some instances, one or more attributes associated with the objects. As described herein, a quality index is associated with the map data and, more particularly, with objects represented by the map data that permits the apparatus of an example embodiment to differently weight reliance upon the map data relative to the other types of sensor data based at least in part upon the quality index associated with the map data. By more greatly weighting reliance upon map data having higher quality than map data having lower quality, the navigation information generated for the vehicle, such as an autonomous vehicle, may be of increased reliability and trustworthiness.

The quality index associated with the map data may be defined in a variety of different manners. In one embodiment, the quality index is comprised of a set of quality values associated with each of a plurality of objects represented by the map data. For example, the set of quality values of one embodiment includes a quality prediction for accuracy of an object (a geospatial accuracy error representative of an absolute position error value for a respective object), a quality prediction for existence confidence of the object and/or a quality prediction for classification confidence of the object.

As the direct measurement of the absolute position error for each map feature is impractical, the set of quality values including the geospatial accuracy error may be predicted, rather than measured. Although the geospatial accuracy error may be predicted in various manners, the absolute position error r is predicted in accordance with an example embodiment by a probability distribution. The probability distribution is characterized by a probability density function $F(r)$ from which the probability that the respective object conforms to an absolute position error requirement of R may be defined as: $A_O = \Pr(r \leq R) = {}^{r=R}\!\int_{r=0} F(r)dr$. Although the probability density function $F(r)$ may be defined in various manners, the probability density function $F(r)$ may, in one embodiment, be defined on a case-by-case basis based upon machine learning-based techniques. By repeating this determination of a probability distribution for each of a number of different objects represented by the map data, the predicted absolute position error r which represents the geospatial accuracy error for the respective object may be defined on a localized basis.

As noted above, the set of quality values also includes the quality prediction for existence confidence, which is a representation of the confidence in the correct representation of a map object. For example, the existence confidence provides a measure of whether the existence of the object represented by the map is a true positive and not a false negative. The existence confidence value may be provided during creation of the map from a predictive model and/or from an object detection algorithm. In an example embodiment, the existence confidence $E_O$ associated with the respective object is defined to be the probability that the respective object is a true positive.

As also noted above, another one of the set of quality values is the quality prediction for classification confidence. The classification confidence presumes the existence of the respective object and provides a measure as to whether the object or an attribute of the respective object has been correctly classified. The classification confidence may be provided during map creation, such as from a predictive model or from a classification algorithm. In one embodiment, the classification confidence $C_A$ is defined as the probability that the attribute is correctly classified.

As described, the quality index, such as a set of quality values, may be defined on a per object basis, that is, with a set of quality values for each respective object. However, the quality index may also or alternatively be defined for a validation group. A validation group refers to a set of objects conforming to one or more feature classes, such as may be predefined. By way of example, predefined feature classes may include bridges, ramps, road dividers, lane marking colors, lane marking material, lane marking style, roadside barriers and sign faces. An individual map object may be an element of multiple validation groups. For example, a road sign may be an element of the classified signs validation group, a localization model objects validation group, and a localization and lane model objects validation group.

The quality index for a validation group is determined with respect to all reference data objects within the feature class contained in the respective validation group. Therefore, with respect to the foregoing example in which the road sign is included in three separate validation groups, the quality index associated with each of the three different validation groups of which the road sign is a member may be associated with the road sign along with the quality index defined on an object-basis for the road sign itself. With respect to the set of quality values described above, the quality prediction for classification confidence is determined only on behalf of a respective object and not for a validation group. However, the geospatial prediction error and the quality prediction for existence confidence may be determined both for a respective object and for each validation group of which the respective object is a member.

With respect to the geospatial prediction error for a validation group, the geospatial prediction error $A_{VG}$ may be defined as a probability distribution for the predicted relative position errors s with the probability density function G(s) being defined as: $A_{VG} = Pr(s \leq S) = {}^{s=S}\!\int_{s=0} G(s)ds$. Although the probability density function G(s) may be defined in various manners, the probability density function G(s) may, in one embodiment, be defined on a case-by-case basis based upon machine learning-based techniques. The probability density function therefore provides a geospatial prediction error for the respective validation group $A_{VG}$ that defines the probability of the overall configuration of the objects in the validation group and whether the configuration of the group of objects matches the configuration of the represented objects in the real world. Additionally, the quality prediction for existence confidence value $E_{VG}$ that is defined for a validation group determines a probability that the objects that are elements of a validation group actually do exist and are therefore represented as true positives with no false negatives. In other words, the existence confidence of the validation group $E_{VG}$ may be defined as a probability as to whether all elements of the respective validation group are truly real world objects and may be provided, for example, by a predictive model or from an object detection algorithm during creation of the map.

By way of example, FIG. 4 depicts a pair of road segments, a plurality of road signs and a ramp. On an object basis and as shown in FIG. 4, a geospatial accuracy error $A_O$, a quality prediction for existence confidence $E_O$ of the object and a quality prediction for classification confidence $C_A$ are defined for each object, that is, for each road sign, the ramp and attributes, e.g., each lane marking, of each road segment. In addition, the set of quality values including the geospatial accuracy error and the quality prediction for existence confidence may be determined for one or more validation groups including a lane lines validation group, a sign faces validation group, etc.

The quality index, such as may be represented by the set of quality values described above, may advantageously indirectly represent other types of quality information. For example, the quality index may indirectly represent measurement and detection uncertainty, such as may be termed fuzziness, that is inherent to certain objects as a result of their shape. For example, the shape of a guard rail may introduce measurement and detection uncertainty as the consistent measurement and communication of the exact position of the guard rail may vary. In this regard, sensors at different heights may identify the guard rail at different offsets, thereby resulting in some degree of measurement and detection uncertainty in the interpreted position of the guard rail. Consequently, the measurement and detection uncertainty, that is the fuzziness, may be indirectly represented by the geospatial prediction error, which, in turn, is based the measured position of the guard rail.

The quality index, such as the set of quality values, may also indirectly represent quality issues associated with the source of the map data. In this regard, characteristics of the source data utilized in creating and updating a map, such as the type of source, the age or lag time associated with the map data that comprise the map, the density with which the map data is captured, the consistency of the map data and the like may be indirectly represented by the quality index. The quality index also indirectly represents any impact upon the quality of the map data introduced by the process by which the objects represented by the map data are created. In this regard, the process by which different objects represented by the map data are created may vary or evolve over time and, as a result, may introduce additional or different quality issues that are indirectly represented by the quality index. The quality index may also indirectly represent quality issues that relate to the administrative area, such as a country or state, in which a real world object represented by the map resides since the quality of the map data associated with different administrative areas may correspondingly vary.

The quality index may be associated with a discrete object, such as may be represented by a single point or a lateral line. In this regard, the quality index may be associated with a variety of different types of discrete objects, such as a road sign, a pole-like object or a lane ending. However, the quality index may also be associated with a continuous object that extens longitudinally along a road, such as across road discretization units, e.g., links. Examples of a continuations object include a road segment, a guard rail standing along a road segment, a lane marker extending along a road segment or the like. In this regard, a road segment is a uniquely identifiable, clearly defined geographic discretization described by starting, ending and lateral boundaries. Additionally or alternatively, the quality index may also be associated with an attribute of an object, such as a sign classification for a discrete object in the form of a road sign and a lane marking color for a continuous object in the form of a road segment.

Referring now to FIG. 2, a block diagram of an apparatus 12 that may be specifically configured in accordance with an example embodiment is depicted. The apparatus may be embodied by a variety of different types of computing devices including, for example, a mapping or navigation system, an advanced driver assistance system (ADAS), a global positioning system (GPS) or other type of computing device onboard or offboard a vehicle, such as an autonomous vehicle. Regardless of the manner in which the apparatus is embodied, the apparatus of the illustrated embodiment includes, is associated with or is in communication with processing circuitry 20, such as a processor 22 and memory 24, and optionally a communication interface 26 and/or a user interface 28.

In some embodiments of the processing circuitry 20, the processor 22 (and/or co-processors or any other circuitry assisting or otherwise associated with the processor) may be in communication with the memory device 24 via a bus for passing information among components of the apparatus 12. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device therefore serves as a computer-readable storage medium, which refers to a physical storage medium (e.g., volatile or non-volatile memory device), and is differentiated from a computer-readable transmission medium, which refers to an electromagnetic signal. The memory device may be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality As such, whether configured by hardware or software methods, or by a combination thereof, the processor may represent an entity (for example, physically embodied in circuitry) capable of performing operations according to an embodiment while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment by further configuration of the processor by instructions for performing the algorithms and/or operations described herein. The processor may include, among other things, a clock, an arithmetic logic unit (ALU) and logic gates configured to support operation of the processor.

The apparatus 12 of an example embodiment also includes a communication interface 26. The communication interface may be any means such as a device or circuitry embodied in either hardware or a combination of hardware and software that is configured to receive and/or transmit data from/to other electronic devices in communication with the apparatus. In this regard, the communication interface may include, for example, an antenna (or multiple antennas) and supporting hardware and/or software for enabling communications with a plurality of different types of networks, such as first and second types of networks. Additionally or alternatively, the communication interface may include the circuitry for interacting with the antenna(s) to cause transmission of signals via the antenna(s) or to handle receipt of signals received via the antenna(s).

The apparatus 12 may also optionally include a user interface 28 that may, in turn, be in communication with the processing circuitry 20 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processing circuitry may comprise user interface circuitry configured to control at least some functions of one or more user interface elements such as a display and, in some embodiments, a plurality of speakers, a ringer, one or more microphones and/or the like. The processing circuitry and/or user interface circuitry may be configured to control one or more functions of one or more user interface elements through computer program instructions (for example, software and/or firmware) stored on a memory accessible to the processing circuitry (for example, memory device 22, and/or the like).

Referring now to FIG. 3, operations are depicted that are performed, such as by the apparatus 12 of FIG. 2, in accordance with an example embodiment in order to facilitate the navigation of a vehicle 10, such as autonomous vehicle. As shown in block 30 of FIG. 3, the apparatus includes means, such as the processing circuitry 20, the processor 22, the communication interface 26 or the like, for receiving a plurality of different types of sensor data, including map data, camera data and detector data. In one embodiment, the map data may be received from a map database 14 that is an integral part of the apparatus or that it is associated with and in communication with the apparatus, such as a remote map database. The camera data and the detector data may be provided by a camera 16 and one or more detector devices 18, such as a radar system, a LIDAR system or the like, carried by the vehicle, such as the autonomous vehicle. The camera data and the detector data may be received by the apparatus directly from the camera and the detector or the camera data and/or the detector data may be stored in memory 22, such as in a database, for subsequent retrieval by the apparatus.

As shown in block 32 of FIG. 3, the apparatus 12 also includes means, such as the processing circuitry 20, the processor 22 or the like, for determining the quality index associated with the map data. Although the apparatus, such as the processing circuitry, may determine the quality index in various different manners, the apparatus, such as the processing circuitry, of an example embodiment may determine the quality index in terms of a set of quality values, such as a quality prediction for accuracy of an object, a quality prediction for existence confidence of the object and/or a quality prediction for classification confidence of the object, as described above. As also described above, the apparatus, such as the processing circuitry, is configured to determine the quality index for each of a plurality of different respective objects represented by the map data and/or for each of a plurality of different validation groups that include one or more objects of a respective type. Further, the apparatus, such as the processing circuitry, of an example embodiment is configured to separately determine the quality index for one or more discrete objects and one or more continuous objects, such as road segments, represented by the map data.

As shown in block 34 of FIG. 3, the apparatus 12 also includes means, such as the processing circuitry 20, the processor 22 or the like, for weighting reliance upon the map data relative to other types of sensor data based upon the quality index associated with the map data. In this regard, the apparatus, such as the processing circuitry, is configured to weight reliance upon the map data by placing increased reliance upon the map data relative to other types of sensor data in an instance in which the quality index indicates that the map data is of a higher quality than in an instance in which the quality index indicates that the map data is of a lower quality. Thus, the map data may be relied upon to a greater extent in an instance in which the quality index indicates that the map data is of a higher quality than in an instance in which the quality index indicates that the map data is of a lower quality. The manner in which the apparatus, such as a processing circuitry, weights reliance upon the map data relative to other types of sensor data may be defined in various manners but, in one embodiment, the weight associated with the map data is proportional to the quality index associated with the map data, such as a normalized representation of the quality index associated with the map data.

As shown in block 36 of FIG. 3, the apparatus 12 further includes means, such as the processing circuitry 20, the processor 22 or the like, for determining navigation information for the vehicle 10 based at least partly upon the weighting of the map data relative to other types of sensor data. In this regard, the apparatus, such as the processing circuitry, is configured to determine the navigation information based more greatly upon the map data relative to the other types of sensor data in an instance in which increased reliance is placed upon the map data relative to other types of sensor data than in an instance in which less reliance is placed upon the map data relative to other types of sensor data. Indeed, in instances in which respective weights are associated with the map data and the other types of sensor data, the navigation information may be determined based upon the respective weights of the map data and the other types of sensor data. In this example, in an instance in which increased reliance is placed upon the map data as a result of the map data have a higher quality index, a route may be defined for the vehicle based principally upon the map data with little reliance upon the other types of sensor data. In contrast, in an instance in which the map data has a relatively low quality index, a route may be defined with greater reliance placed upon other types of sensor data including camera data and/or detector data, with less reliance placed upon the map data as a result of its lower quality index.

In terms of the reliance upon the map data relative to other types of sensor data, each autonomous vehicle may have a different need from the map such that the apparatus 12, such as the processing circuitry 20, of an example embodiment can tailor its reliance upon the map data relative to other types of sensor data so as to determine best route subject to the needs for the vehicle. In terms of navigation information, the quality index may additionally or alternatively allow a vehicle to select among various candidate routes in order to increase the map quality. In some embodiments, the manner in which reliance upon the map data is weighted relative to other types of sensor data may also depend, at least partly, upon other factors, such as weather data with the reliance upon the map data relative to the other types of sensor data at least partly dependent upon the weather through which the vehicle 10 is or will be driving.

In the foregoing example, the vehicle 10 may be an autonomous vehicle and the apparatus 12, such as a processing circuitry 20, may be configured to determine the navigation information by defining the route to be followed by the autonomous vehicle based at least partly upon the weighting of the map data relative to other types of sensor data. However, the navigation information that is determined may be utilized by other types of vehicles, such as in conjunction with the definition of a route, the calculation of an estimated arrival time or the like for a driver of a manually actuated vehicle.

In an example embodiment, the quality index is dynamic with the quality index associated with the map data and the weighted reliance upon the map data being repeatedly determined to take into account, for example, the decay and refreshing of the quality index and/or the capture of new or different map data. For example, the apparatus 12 of this embodiment also includes means, such as a processing circuitry 20, the processor 22 or the like, for determining whether the quality index is to be modified and, if so, for modifying the quality index associated with one or more objects represented by the map data over time. See block 38 of FIG. 3. In this regard, the apparatus, such as the processing circuitry, is configured to cause the quality index associated with the one or more objects to decay over time until the map data associated with the one or more objects is refreshed. The decay of the quality index reflects the gradual reduction in the quality of the map data representative of a respective object as time passes since the location and presence of the respective object may change over time so as to no longer be as accurately represented by the map data, thereby resulting in a lower and decaying quality index over time. The quality index associated with one or more objects may decay at different rates over time depending upon the type of object represented by the map data. For example, some types of objects vary little, if at all, in terms of position and existence over time so as to thereby have a quality index that decays very slowly, if at all, over time. In contrast, other objects are more likely to experience a change in position or existence over time and, as a result, may have a corresponding quality index that decays more rapidly over time. The rate at which the quality index associated with different types of objects decays may be predefined based upon the type of object with the rates of decay stored, for example, by memory 24 and referenced by the processing circuitry in order to modify the quality index, such as on a repeated or periodic basis. Following modification of the quality index as a result of its decay, the apparatus, such as the processing circuitry, may again weight the reliance upon the map data to other types of sensor data based upon the quality index associated with the map data and then determine navigation information for the vehicle at least partly based upon the weighting of the map data relative to the other types of sensor data.

Once refreshed, the quality index associated with objects represented by the map may again be determined, frequently with the resulting quality index indicating that the map data is of a higher quality than the prior decayed version of the map data representative of the respective object. Thus, the navigation information for the vehicle may be repeatedly determined following the repeated determination of the quality index associated with the map data and the repeated weighted reliance upon the map data relative to other types of sensor data based upon the quality index associated with the map data due to the decay of the quality index over time and the refreshing of the map data, and/or as a result of the receipt of additional or new sensor data, including additional or new map data.

The apparatus 12, method and computer program product of an example embodiment facilitate the navigation of a vehicle 10, such as an autonomous vehicle, utilizing map data in which the quality associated with the map data is provided in a more computationally efficient manner, such as based upon a prediction as opposed to a comparison to reference data. By providing an indication as to the quality associated with the map data, the navigation of a vehicle, such as an autonomous vehicle, may take into account the quality associated with the map data in relation to determining the manner in which the map data is to be combined with other types of sensor data, thereby allowing for the navigation of the autonomous vehicle in a reliable and trustworthy manner. The quality information associated with the map data in accordance with an example embodiment is granular or localized as a result of its association with an object and/or attributes of an object, thereby further facilitating the determination as to the manner in which the map data can be relied upon relative to other types of sensor data in conjunction with the navigation of a vehicle in a localized manner Thus, the manner in which the different types of sensor data, including map data, are combined in order to facilitate navigation of a vehicle may vary from location to location depending upon changes in the quality associated with the map data at the different locations and/or changes in the quality associated with the map data over time, thereby further increasing the reliability and trustworthiness of the navigation supported by the map data.

As described above, FIG. 3 illustrates a flowchart of an apparatus 12, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 24 of an apparatus and executed by the processing circuitry 20, the processor 22 or the like. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for facilitating navigation of a vehicle, the method comprising:
  receiving a plurality of different types of sensor data including map data, camera data and detector data;
  determining, by a processor, a quality index associated with the map data, wherein determining the quality index at least partially comprises determining a quality prediction for existence confidence of an object, wherein the quality prediction for existence confidence provides an indication as to a probability that the object is a true positive;

weighting reliance upon the map data relative to other types of sensor data based upon the quality index associated with the map data; and determining navigation information for the vehicle based at least partly upon the weighting of the map data relative to other types of sensor data.

2. A method according to claim 1 wherein weighting reliance upon the map data comprises placing increased reliance upon the map data relative to other types of sensor data in an instance in which the quality index indicates that the map data is of a higher quality than in an instance in which the quality index indicates that the map data is of a lower quality.

3. A method according to claim 1 wherein receiving the plurality of different types of sensor data comprises receiving camera data and detector data from a camera and a detector, respectively, onboard the vehicle.

4. A method according to claim 1 wherein the vehicle is an autonomous vehicle, and wherein determining navigation information comprises defining a route to be followed by the autonomous vehicle based at least partly upon the weighting of the map data relative to other types of sensor data.

5. A method according to claim 1 further comprising modifying the quality index associated with one or more objects represented by the map data over time by causing the quality index associated with the one or more objects to decay over time until the map data associated with the one or more objects is refreshed.

6. A method according to claim 5 wherein the quality index associated with one or more objects decays at different rates over time depending upon a type of object represented by the map data.

7. A method according to claim 1 wherein determining the quality index comprises separately determining the quality index for one or more discrete objects and one or more continuous objects represented by the map data.

8. A method according to claim 1 wherein determining the quality index further comprises determining one or more of a quality prediction for accuracy of the object or a quality prediction for classification confidence of the object.

9. An apparatus for facilitating navigation of a vehicle, the apparatus comprising at least one processor and at least one memory including computer program code, the at least one memory and computer program code configured to, with the processor, cause the apparatus to at least:
receive a plurality of different types of sensor data including map data, camera data and detector data;
determine, by the at least one processor, a quality index associated with the map data, wherein determining the quality index at least partially comprises determining a quality prediction for existence confidence of an object, wherein the quality prediction for existence confidence provides an indication as to a probability that the object is a true positive;
weight reliance upon the map data relative to other types of sensor data based upon the quality index associated with the map data; and
determine navigation information for the vehicle based at least partly upon the weighting of the map data relative to other types of sensor data.

10. An apparatus according to claim 9 wherein the at least one memory and computer program code are configured to, with the processor, cause the apparatus to weight reliance upon the map data by placing increased reliance upon the map data relative to other types of sensor data in an instance in which the quality index indicates that the map data is of a higher quality than in an instance in which the quality index indicates that the map data is of a lower quality.

11. An apparatus according to claim 9 wherein the at least one memory and computer program code are configured to, with the processor, cause the apparatus to receive the plurality of different types of sensor data by receiving camera data and detector data from a camera and a detector, respectively, onboard the vehicle.

12. An apparatus according to claim 9 wherein the vehicle is an autonomous vehicle, and wherein the at least one memory and computer program code are configured to, with the processor, cause the apparatus to determine navigation information by defining a route to be followed by the autonomous vehicle based at least partly upon the weighting of the map data relative to other types of sensor data.

13. An apparatus according to claim 9 wherein the at least one memory and computer program code are further configured to, with the processor, cause the apparatus to modify the quality index associated with one or more objects represented by the map data over time by causing the quality index associated with the one or more objects to decay over time until the map data associated with the one or more objects is refreshed.

14. An apparatus according to claim 13 wherein the quality index associated with one or more objects decays at different rates over time depending upon a type of object represented by the map data.

15. An apparatus according to claim 9 wherein the at least one memory and computer program code are configured to, with the processor, cause the apparatus to determine the quality index by separately determining the quality index for one or more discrete objects and one or more continuous objects represented by the map data.

16. An apparatus according to claim 9 wherein the at least one memory and computer program code are configured to, with the processor, cause the apparatus to further determine the quality index by determining one or more of a quality prediction for accuracy of the object or a quality prediction for classification confidence of the object.

17. A computer program product for facilitating navigation of a vehicle, the computer program product comprising at least one non-transitory computer-readable storage medium having computer-executable program code portions stored therein, the computer-executable program code portions comprising program code instructions configured to:
receive a plurality of different types of sensor data including map data, camera data and detector data;
determine, by a processor, a quality index associated with the map data, wherein to determine the quality index at least partially comprises determining a quality prediction for existence confidence of an object, wherein the quality prediction for existence confidence provides an indication as to a probability that the object is a true positive;
weight reliance upon the map data relative to other types of sensor data based upon the quality index associated with the map data; and
determine navigation information for the vehicle based at least partly upon the weighting of the map data relative to other types of sensor data.

18. A computer program product according to claim 17 wherein the program code instructions configured to weight reliance upon the map data comprise program code instructions configured to place increased reliance upon the map data relative to other types of sensor data in an instance in which the quality index indicates that the map data is of a higher quality than in an instance in which the quality index indicates that the map data is of a lower quality.

19. A computer program product according to claim 17 wherein the program code instructions configured to receive the plurality of different types of sensor data comprise program code instructions configured to receive camera data and detector data from a camera and a detector, respectively, onboard the vehicle.

20. A computer program product according to claim 17 wherein the vehicle is an autonomous vehicle, and wherein the program code instructions configured to determine navigation information comprise program code instructions configured to define a route to be followed by the autonomous vehicle based at least partly upon the weighting of the map data relative to other types of sensor data.

21. A computer program product according to claim 17 wherein the computer-executable program code portions further comprise program code instructions configured to modify the quality index associated with one or more objects represented by the map data over time by causing the quality index associated with the one or more objects to decay over time until the map data associated with the one or more objects is refreshed.

22. A computer program product according to claim 21 wherein the quality index associated with one or more objects decays at different rates over time depending upon a type of object represented by the map data.

23. A computer program product according to claim 17 wherein the program code instructions configured to determine the quality index comprise program code instructions configured to separately determine the quality index for one or more discrete objects and one or more continuous objects represented by the map data.

24. A computer program product according to claim 17 wherein the program code instructions configured to determine the quality index comprise program code instructions configured to further determine one or more of a quality prediction for accuracy of the object or a quality prediction for classification confidence of the object.

* * * * *